(12) United States Patent
Theiss et al.

(10) Patent No.: US 12,111,137 B2
(45) Date of Patent: Oct. 8, 2024

(54) AERIAL ARRESTING SYSTEM FOR UNMANNED AERIAL VEHICLE

(71) Applicants: Shawn M. Theiss, North Benton, OH (US); Michael E. Rogers, Raleigh, NC (US)

(72) Inventors: Shawn M. Theiss, North Benton, OH (US); Michael E. Rogers, Raleigh, NC (US)

( * ) Notice: Subject to any disclaimer, the term of this patent is extended or adjusted under 35 U.S.C. 154(b) by 0 days.

(21) Appl. No.: 16/124,363

(22) Filed: Sep. 7, 2018

(65) Prior Publication Data

US 2019/0078859 A1 Mar. 14, 2019

Related U.S. Application Data

(63) Continuation of application No. 15/055,392, filed on Feb. 26, 2016, now abandoned.

(Continued)

(51) Int. Cl.
*F41H 13/00* (2006.01)
*B64C 39/02* (2023.01)
*B64U 70/30* (2023.01)

(52) U.S. Cl.
CPC ....... *F41H 13/0006* (2013.01); *B64C 39/024* (2013.01); *B64U 70/30* (2023.01)

(58) Field of Classification Search
CPC ..... F41B 1/00; F41B 11/62; F41F 1/08; F41C 27/00; F41H 13/00; F41H 13/0006;

(Continued)

(56) References Cited

U.S. PATENT DOCUMENTS 1,309,530 A 7/1919 Lamberson
3,349,514 A 10/1967 Trechot
(Continued)

FOREIGN PATENT DOCUMENTS

CN 102384702 3/2012
CN 107976118 A 5/2018
(Continued)

OTHER PUBLICATIONS

Michigan Tech News, Marcia Goodrich, "Drone Catcher: 'Robotic Falcon' can Capture, Retrieve Renegade Drones" pp. 1-2, Jan. 7, 2016, https://www.mtu.edu/news/stories/2016/january/drone-catcher-robotic-falcon-can-capture-retrieve-renegade-drones.html.

(Continued)

*Primary Examiner* — Jonathan C Weber
(74) *Attorney, Agent, or Firm* — Fred Zollinger

(57) ABSTRACT

A device launcher can be carried and be used to launch a device by an airborne UAV against an airborne or ground target. The target can be a moving target with the device configured to slow or disable the movement of the target. The device can be triggered manually or through an automated targeting system. The launch apparatus can be configured to launch a single device or a plurality of devices. The device launched against the target can be separated from the launch vehicle or tethered to the launch vehicle. The device can be a net that entangles the rotors of a rotor-driven vehicle. The device can include a parachute to retard movement of target vehicle whether it is falling or if it continues to move. A method of patrolling a perimeter with an airborne vehicle includes the steps of moving the airborne vehicle within the perimeter to sense unauthorized targets and launching a device against those sensed targets.

20 Claims, 10 Drawing Sheets

Related U.S. Application Data

(60) Provisional application No. 62/262,264, filed on Dec. 2, 2015, provisional application No. 62/176,670, filed on Feb. 26, 2015.

(58) Field of Classification Search
CPC .. F41H 1/05; F41H 11/02; F42B 12/68; F42B 12/66; F42B 30/00
USPC ........ 89/1.11, 1.34, 1.1, 1.41; 102/502, 504, 102/293; 124/56, 71–77, 1; 42/106; 294/110 C
See application file for complete search history.

(56) References Cited

U.S. PATENT DOCUMENTS

| | | | |
|---|---|---|---|
| 3,803,463 | A | 4/1974 | Cover |
| 4,253,132 | A | 2/1981 | Cover |
| 4,656,945 | A | 4/1987 | Stancil |
| 4,912,869 | A | 4/1990 | Govett |
| 5,583,311 | A | 12/1996 | Rieger |
| 5,750,918 | A | 5/1998 | Mangolds |
| 5,898,125 | A | 4/1999 | Mangolds et al. |
| 6,854,374 | B1 | 2/2005 | Breazeale |
| 6,904,838 | B1 | 6/2005 | Dindl |
| 7,264,204 | B1 | 9/2007 | Portmann |
| 7,328,644 | B2 | 2/2008 | Vickroy |
| 7,398,617 | B2 | 7/2008 | Mattox |
| 7,866,250 | B2 | 1/2011 | Farinella |
| 8,123,176 | B2 | 2/2012 | Mak |
| 8,205,537 | B1 | 6/2012 | Dupont |
| 8,375,837 | B2 | 2/2013 | Goossen et al. |
| 8,387,540 | B2 | 3/2013 | Merems |
| 8,596,178 | B2 | 12/2013 | Rogers et al. |
| 8,662,441 | B2 | 3/2014 | Powell et al. |
| 9,074,858 | B2 | 7/2015 | Yee |
| 9,085,362 | B1 | 7/2015 | Kilian et al. |
| 9,134,098 | B1 | 9/2015 | Pruett |
| 9,134,099 | B2 | 9/2015 | Tseng |
| 9,187,184 | B2 | 11/2015 | Miralles et al. |
| 9,221,557 | B1 | 12/2015 | Friesel |
| 9,527,603 | B2 | 12/2016 | Allen et al. |
| 9,656,765 | B2 | 5/2017 | von Flotow et al. |
| 10,005,556 | B2 | 6/2018 | Rastgaar Aagaah et al. |
| 2001/0032577 | A1 | 10/2001 | Swartout |
| 2002/0134365 | A1 | 9/2002 | Gray |
| 2005/0166441 | A1 | 8/2005 | Mattox |
| 2006/0169832 | A1 | 8/2006 | Glasson |
| 2006/0219094 | A1 | 10/2006 | Padan |
| 2007/0169616 | A1 | 7/2007 | Vickroy |
| 2007/0180983 | A1 | 8/2007 | Farinella et al. |
| 2007/0261542 | A1 | 11/2007 | Chang et al. |
| 2009/0008499 | A1* | 1/2009 | Shaw .................. B64C 27/52 244/17.23 |
| 2009/0050750 | A1 | 2/2009 | Goossen |
| 2009/0084284 | A1 | 4/2009 | Martinez |
| 2009/0173250 | A1 | 7/2009 | Marscher |
| 2010/0237183 | A1 | 9/2010 | Wilson et al. |
| 2010/0282058 | A1 | 11/2010 | Nelson et al. |
| 2011/0005373 | A1 | 1/2011 | Martinez |
| 2011/0220087 | A1 | 9/2011 | Gerwig |
| 2012/0011996 | A1 | 1/2012 | Glasson |
| 2012/0192707 | A1 | 8/2012 | Rogers et al. |
| 2012/0210851 | A1 | 8/2012 | Glasson |
| 2012/0210904 | A1 | 8/2012 | Merems |
| 2014/0000145 | A1 | 1/2014 | Merritt |
| 2014/0216290 | A1 | 8/2014 | Yee |
| 2014/0231575 | A1 | 8/2014 | Shand |
| 2014/0331984 | A1 | 11/2014 | Brahler |
| 2015/0168107 | A1 | 6/2015 | Tseng |
| 2015/0241180 | A1 | 8/2015 | Pruett |
| 2015/0316345 | A1 | 11/2015 | Brahler |
| 2015/0360797 | A1 | 12/2015 | Melish et al. |
| 2016/0023760 | A1 | 1/2016 | Goodrich |
| 2016/0161225 | A1 | 6/2016 | Searle |
| 2016/0194069 | A1 | 7/2016 | Taylor |
| 2016/0245600 | A1 | 8/2016 | Merritt |
| 2016/0251088 | A1 | 9/2016 | Melish et al. |
| 2016/0376029 | A1 | 12/2016 | Sekiya |
| 2017/0036762 | A1 | 2/2017 | Gamble et al. |
| 2017/0158340 | A1 | 6/2017 | von Flotow et al. |
| 2017/0225784 | A1 | 8/2017 | Hayes et al. |
| 2017/0355461 | A1 | 12/2017 | Naito et al. |
| 2017/0356726 | A1 | 12/2017 | Theiss et al. |
| 2018/0105271 | A1 | 4/2018 | Wypyszynski et al. |
| 2018/0162530 | A1 | 6/2018 | Klein |
| 2018/0170510 | A1 | 6/2018 | Brock |
| 2019/0047696 | A1 | 2/2019 | Gwin |

FOREIGN PATENT DOCUMENTS

| | | |
|---|---|---|
| CN | 108082510 A | 5/2018 |
| DE | 102015003323 A1 | 9/2016 |
| EP | 2186728 B1 | 5/2010 |
| KR | 101857135 B1 | 5/2018 |
| WO | 2014080387 A2 | 5/2014 |
| WO | 2017037698 A1 | 3/2017 |

OTHER PUBLICATIONS

BBC News, Technology, "Drone squad to be launched by Tokyo police" pp. 1-2, Dec. 11, 2015, https://www.bbc.com/news/technology-35070818.

Airspace, "Drone Security System" p. 1, accessed Aug. 29, 2018, https://airspace.co/.

Unmanned Aerial Systems—A Beginners Guide, "Drone Catcher!" pp. 1-2, Feb. 12, 2015, https://overlanduas.wordpress.com/2015/02/12/drone-catcher/.

Reuters, Technology News, Stephen Nellis, "Drone-catchers emerge on a new aerial frontier" pp. 1-6, Mar. 21, 2017, https://www.reuters.com/article/us-usa-drone-hunter-idUSKBN16S1IT.

Military & Aerospace Electronics, John Keller, "Navy demonstrates ability to launch surveillance UAVs stealthily from submerged submarines" pp. 1-3, Dec. 6, 2013, https://www.militaryaerospace.com/trusted-computing/article/16715659/navy-demonstrates-ability-to-launch-surveillance-uavs-stealthily-from-submerged-submarines.

Raytheon, "Coyote UAS" pp. 1-5, accessed Aug. 30, 2018 from https://www.raytheon.com/capabilities/products/coyote.

New Scientist, Technology, Chris Baraniuk, "The no-drone zone: How to stop UAVs spying on us from above" pp. 1-3, Apr. 28, 2015, https://www.newscientist.com/article/dn27429-the-no-drone-zone-how-to-stop-uavs-spying-on-us-from-above/.

The Telegraph, Rhiannon Williams, "Tokyo police are using drones with nets to catch other drones" pp. 1-2, Dec. 11, 2015, https://www.telegraph.co.uk/technology/2016/01/21/tokyo-police-are-using-drones-with-nets-to-catch-other-drones/.

* cited by examiner

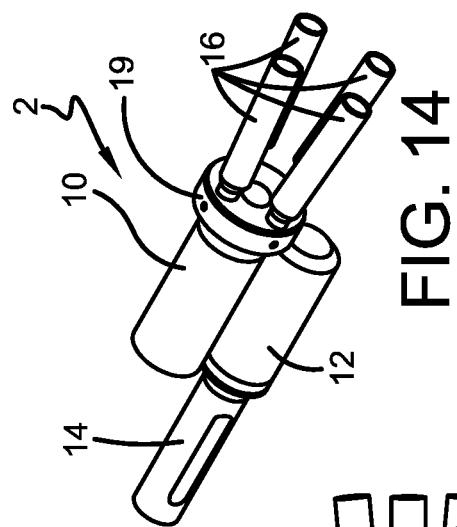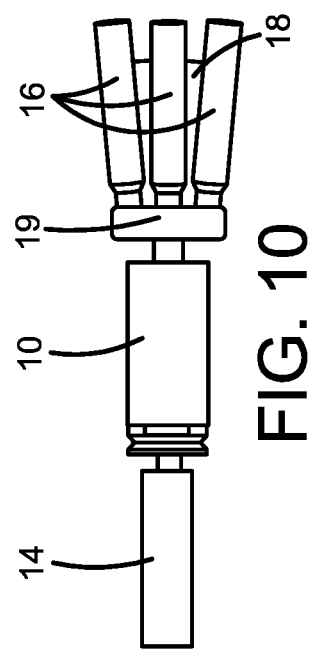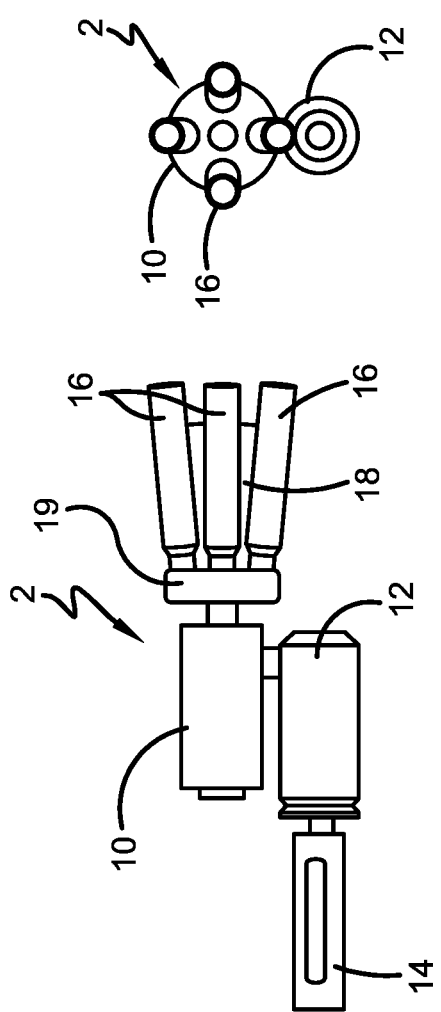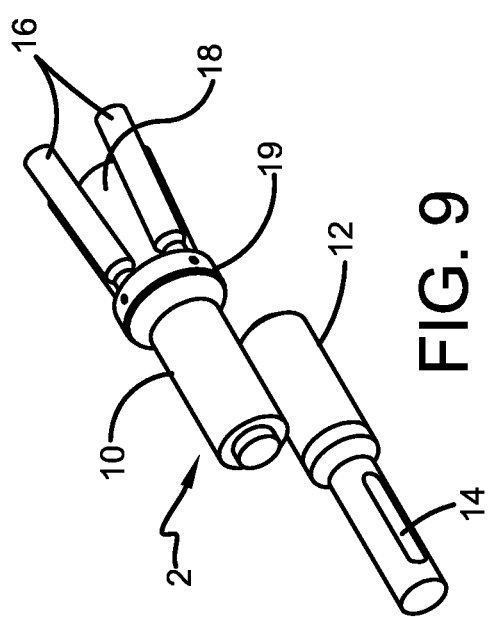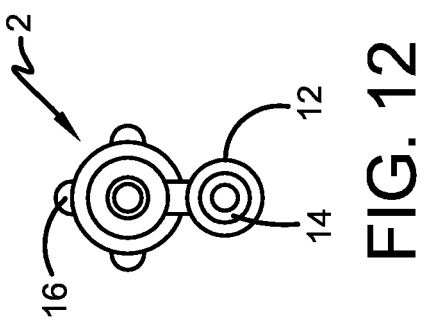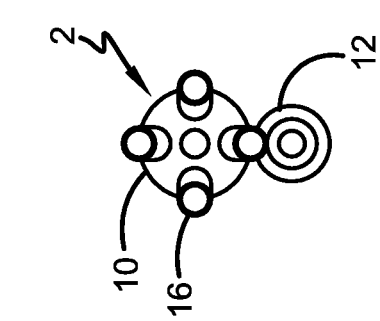
FIG. 9
FIG. 10
FIG. 11
FIG. 12
FIG. 13
FIG. 14

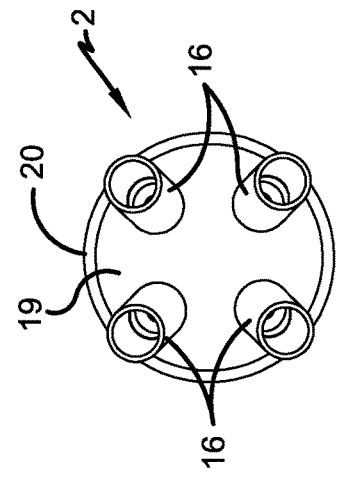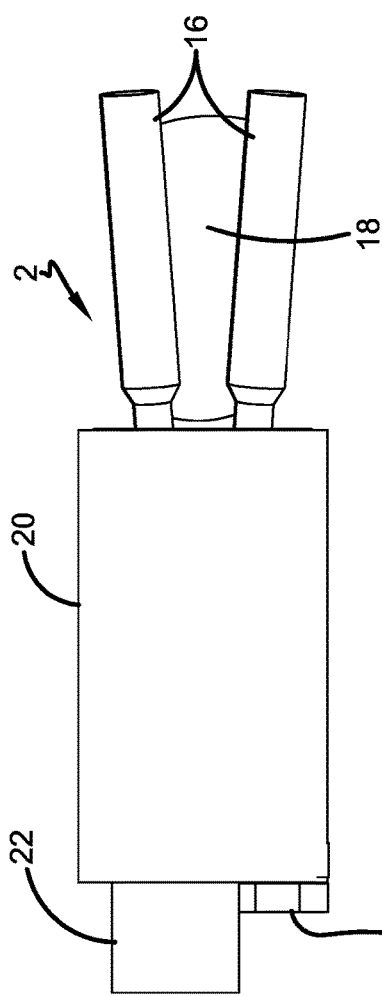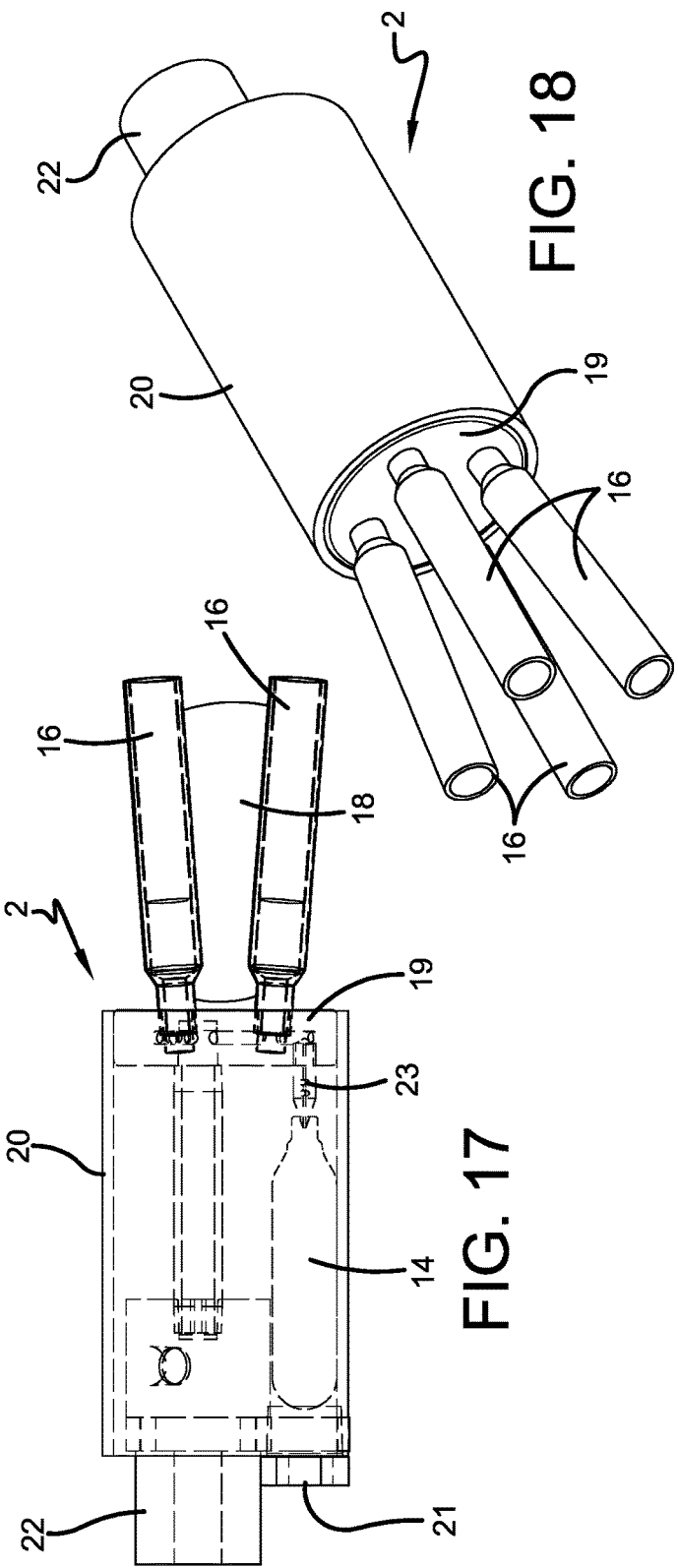

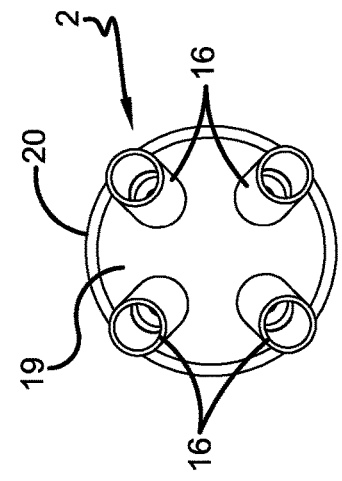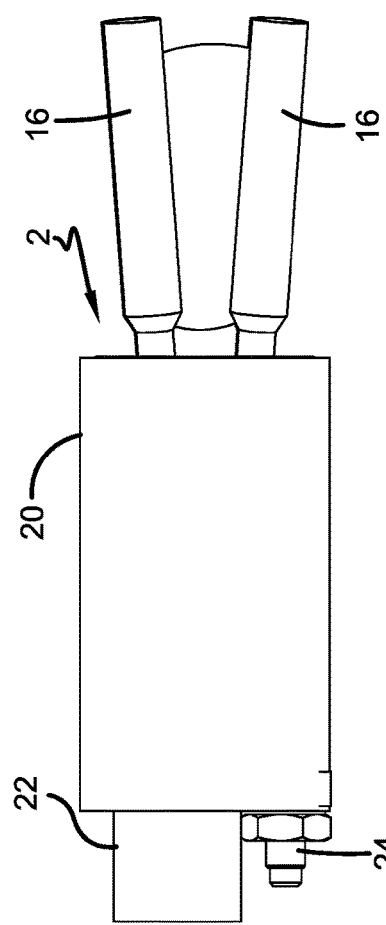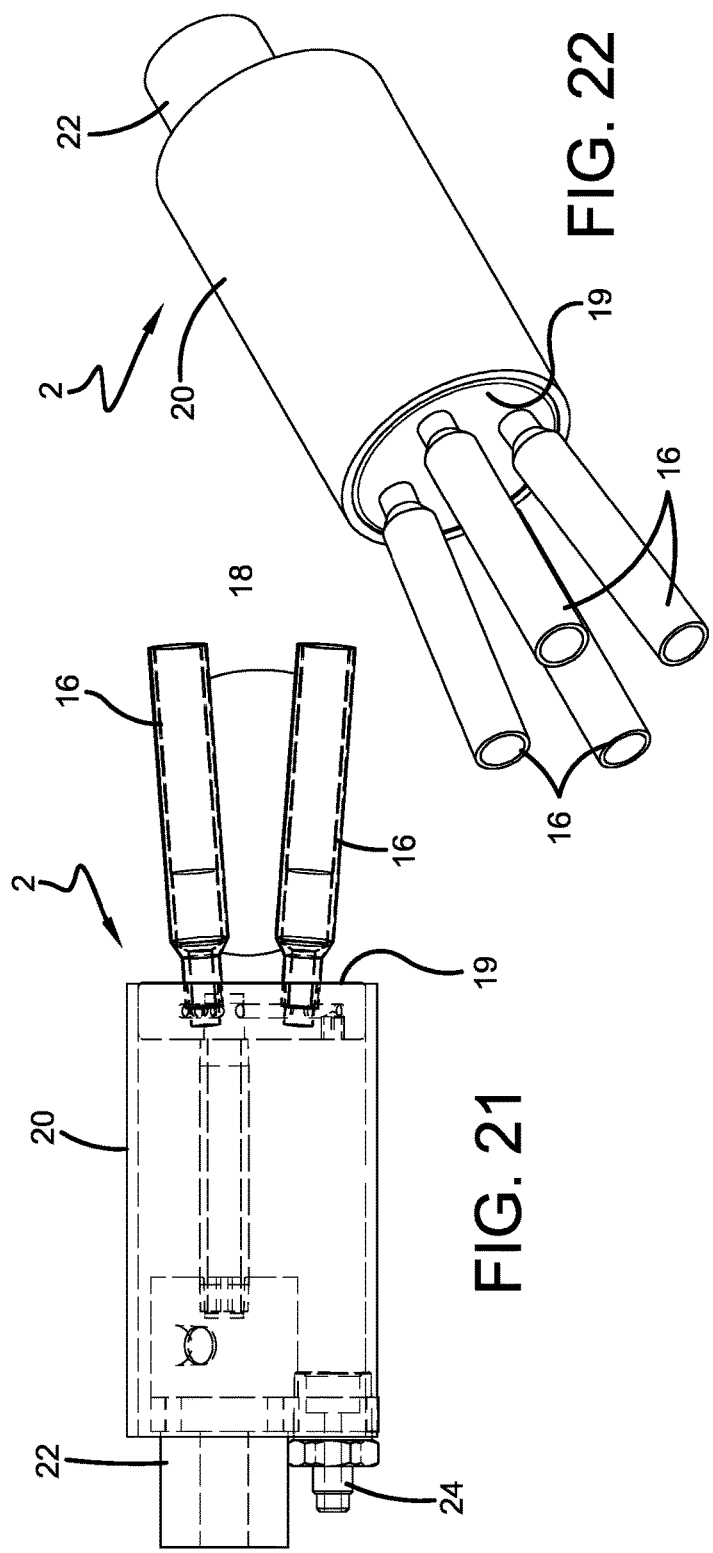

AERIAL ARRESTING SYSTEM FOR UNMANNED AERIAL VEHICLE

CROSS REFERENCE TO RELATED APPLICATIONS

This application is a continuation application claiming priority to U.S. patent application Ser. No. 15/055,392 filed Feb. 26, 2016, which application claims the benefit of U.S. Provisional Patent Application 62/176,670 filed Feb. 26, 2015 and 62/262,264 filed Dec. 2, 2015; the disclosures of each are incorporated herein by reference.

BACKGROUND OF THE DISCLOSURE

1. Technical Field

The disclosure generally relates to aerial arresting devices and methods for using the devices for eliminating or reducing an aerial device such as an unmanned aerial vehicle (UAV) or drone. More particularly, the disclosure relates to aerial arresting devices and methods that launch a device such as a net from one aerial vehicle to disrupt or discontinue the operation of another aerial vehicle. The disclosure relates to devices launched manually and automatically.

2. Background Information

Privately-owned aerial vehicles have increased in numbers especially unmanned aerial vehicles (UAVs) which are commonly referred to as drones. These vehicles have historically been for hobbyists who enjoy flying and the challenges of building airborne vehicles and controlling them with a short range radio controller. With the dramatic rise in smartphone technology, miniaturization of cameras, and fast, ubiquitous cellular communications technologies, the use of UAVs for aerial photography or the delivery of goods has increased. Although many of these uses are beneficial to society, some have found uses for drones that do not benefit the general public. One example is the delivery of contraband over borders or inside prison walls. Another example is photography of private areas at low elevations or real-time surveillance of private leisure or commercial activities from low elevation positions that were previously unattainable by a photographer. Other UAV activities are dangerous such as when a UAV flies into the airspace used by airplanes. As the uses of UAVs increases, those persons in charge of securing the facilities or activities above desire a safe device and method for disabling a UAV.

SUMMARY OF THE DISCLOSURE

The disclosure provides devices and methods for disabling airborne vehicles using a device or devices launched from another airborne vehicle. In particular, the devices and methods relate to the disabling a multi-prop unmanned aerial vehicle (UAV) with a net launched from another UAV in order to entangle the rotors of the target vehicle. The net can be tethered to the launch vehicle to allow the launch vehicle to retrieve the target. Alternatively or selectively, the net can be released from the launch vehicle to allow the launch vehicle to proceed unencumbered or to proceed operations when the target is too large to carry.

The disclosure also provides a device launcher that can be carried by and used to launch a device by an airborne UAV against an airborne or ground target. The target can be a moving target with the device configured to slow or disable the movement of the target. The device can be triggered manually by the operator or through an automated targeting system using data from one or more sensors. The launch apparatus can be configured to launch a single device or a plurality of devices. The device launched against the target can be separated from the launch vehicle or tethered to the launch vehicle. The device can be a net that entangles the rotors of a rotor-driven vehicle. The device can include a parachute to retard movement of target vehicle whether it is falling or if it continues to move.

The disclosure provides different configurations of the device launcher with different options for providing charges to the device launcher. Devices with quick-refill and quick reload capabilities include configurations with removable and replaceable compressed gas cartridges and embodiments with gas valves selectively connectable to sources of compressed gas (such as compressors or large storage tanks) for refill.

The disclosure provides an adjustable launching platform that allows the direction of launch to be adjusted with respect to the launch vehicle.

The disclosure provides a method for patrolling an area against unauthorized incursions by an aerial vehicle and arresting the vehicle which makes the unauthorized incursion.

The preceding non-limiting aspects, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 9 is a perspective view of the device launcher of FIGS. 7 and 8.

FIG. 10 is a top plan view of FIG. 9.

FIG. 11 is a side view of FIG. 9.

FIG. 12 is an end view from the left side of FIG. 11.

FIG. 13 is an end view from the right side of FIG. 11.

FIG. 14 is another perspective view of the device launcher of FIGS. 7 and 8.

FIG. 15 is a side view of another configuration for the device launcher.

FIG. 16 is an end view of FIG. 15.

FIG. 17 is a side view similar to FIG. 15 depicting the internal components.

FIG. 18 is a perspective view of the configuration of FIG. 15.

FIG. 19 is a side view of another configuration for the device launcher.

FIG. 20 is an end view of FIG. 19 (net not shown for clarity).

FIG. 21 is a side view similar to FIG. 19 depicting the internal components.

FIG. 22 is a perspective view of the configuration of FIG. 19 (net not shown for clarity).

Similar numbers refer to similar elements.

DETAILED DISCLOSURE

Figure 1:
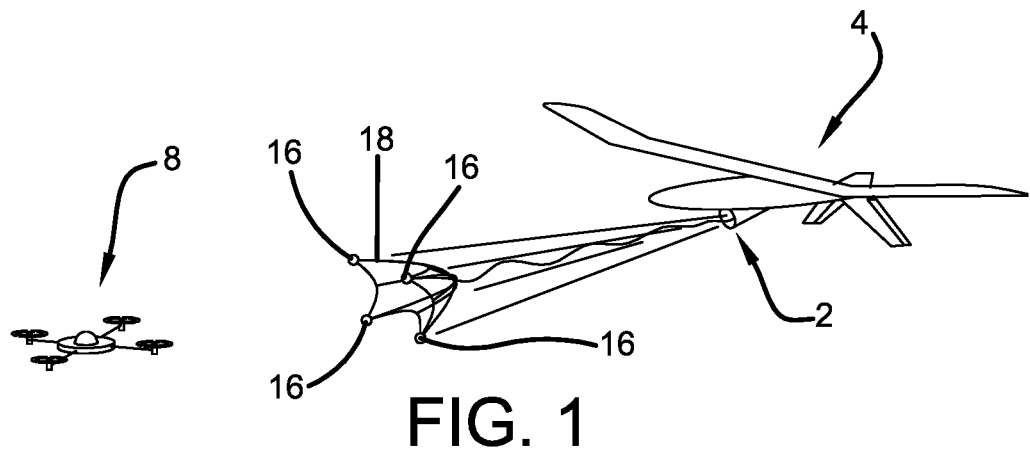
FIG. 1 depicts an exemplary fixed wing aircraft launching a tethered device at an airborne target.

The different configurations of the launch devices are indicated generally by the numeral 2 in the accompanying drawings. Launch devices 2 are carried by airborne vehicles 4 such as the fixed wing device depicted in FIGS. 1-3 or the rotor-type device depicted in FIGS. 4 and 6. Different vehicles can be used including manned aircraft or unmanned aircraft, fixed wing, rotorcraft, ducted-fan, ornithopter or orthopter, rocket/missile, and/or lighter-than-air. The rotor-type vehicle can be a multiple-rotor unmanned aerial vehicle (UAV) or drone which is controlled by a user through a controller 6 such as a radio frequency controller or a mobile computer such as a smart phone using cellular, WIFI, ZigBee®, Bluetooth®, WiMAX, communications protocols or a combination of both. The target 8 can be another airborne vehicle or a ground-based target. The ground-based target can be a vehicle, a person, or an animal. Launch device 2 is configured to be operated while vehicle 4 is airborne and in motion. Launch device 2 can launch its device in the same direction as vehicle 4 is traveling. Launch device 2 can be manually triggered by the user or can be automatically triggered in response to a sensor signal generated from a sensor carried by vehicle 4.

Vehicle 4 can be a type vehicles having a range of less than 10 kilometers. Vehicle 4 also can be the type that must be in line of sight with the user for operation.

Launch device 2 can be mounted in a fixed or adjustable position on vehicle 4. For example, device 2 in FIG. 4 can be mounted in a fixed position to the frame of vehicle 4 with the device to be launched extended under the front two rotors of vehicle 4. The mount that secures launch device 2 to vehicle 4 can include a mount 5 that can be a swivel mount or a pivot mount or both to allow launch device 2 to be aimed by the user or the automatic targeting system. Launch device 2 can be mounted to vehicle 4 in a configuration that allows launch device 2 to swivel in either direction through an entire 360 degree arc or rotate in either direction in continuous 360 degree circles. Launch device 2 also can pivot up and down so that its device can be launched directly upward or directly downward. The upward launch direction uses a mount that positions the device to be launched between rotors or radially outwardly of the rotors so that the launch does not disrupt the operation of vehicle 4. The movements of launch device 2 can be powered by motors carried by vehicle 4 and controlled by the user or by the automatic targeting system. Launch device 2 can be configured to allow the user to trigger the launch at any time after launch device 2 is armed.

Vehicle 4 can carry a camera that is used to provide live video data to the user. The camera can be fixed with vehicle 4 and move with vehicle 4 or the camera can be mounted with launch device 2 and move together with launch device 2. The person controlling the flight of vehicle 4 or the position of launch device 2 uses the images from the video camera to position vehicle 4 (or manipulate the mount of launch device 2) before triggering the launch of its device. Gauge lines can be provided on the video screen or a gauge can be positioned in front of the camera lens in order to allow the user to estimate the distance to target 8. The video images can be used alone or in combination with data from other sensors such as those described below.

An automatic targeting system can be used to operate launch device 2. The system includes one or more sensors 9 carried by vehicle 4 to provide data to a computer (either carried by vehicle 4 or at a remote location) that can trigger launch device 2 when criteria are met for a launch that has a high chance of success. The user controls the parameters used such that device 2 will only launch in situations wherein the chance of a successful capture is above a controllable threshold. For example, the user may set device 2 and the automated system to only launch when there is a 95% of a capture. Sensors 9 include the camera discussed above, a communications signal detector such as a radio frequency or WIFI detector, a radar device, a sonar device, a motion detector such as an infrared motion detector, a range finder, and/or an acoustic sensor. Any one of these or any combination of these sensors can be carried by vehicle 4 and provide data to a computer that is programmed with software or instructions that creates the launch signal when certain criteria are met. For example, the criteria can be a distance measurement between sensor 9 and target 8 or a combination of a video image from camera in combination with a distance measurement. Another example, is a combination of a distance measurement in combination with a comparison of relative speeds and directions between vehicle 4 and target 8. This configuration relies on the remote human operator to pilot vehicle 4.

The aerial vehicle 4 can be provided with an autopilot and/or an auto-launch mode wherein the computer controls the flight commands of vehicle 4 to bring itself within launch range of target 8 and then automatically launching its device when a position is acquired that has a high probability of a capture. Vehicle 4 can turn its controls back to the operator automatically after launching its device or only when a signal is received from the operator.

Another feature of the autopilot system is a sentinel mode which instructs vehicle 4 to patrol (via a fixed pattern or a random pattern control) an area inside a security perimeter or patrol along a security perimeter or security line. The position of vehicle 4 can be controlled based on Global Positioning System (GPS) signals or other location data. The autopilot system continually or periodically senses the area around its location for unauthorized devices. Upon acquisition of a signal indicating an unauthorized device, the autopilot system controls the movement of vehicle 4 to position vehicle 4 for a successful launch. The autopilot system also sends an alert signal to the user. Such sentinels are programmed to recognize another aerial vehicle from birds and airborne debris using data from additional sensors.

The configurations of launch device 2 depicted in FIGS. 7-30 are configured to launch one or more devices in the form of weighted nets 18. Net 18 includes at least one projectile weight 16 upon which the launch force from device 2 acts to project net 18 away from device 2. Projectile weights 16 can be connected directly to the net structure or by cable (such as cables 32 shown in FIGS. 27-30). The relatively light-weight netting is carried by the flight of projectile weights 16. Projectile weights 16 are launched at trajectories away from on another to cause net 18 to spread out for effective target capture. Projectile weights 16 can be carried in tubes or on guides both of which help direct weights 16 in a desired direction from device 2. The launch of net 18 is triggered by an electric switch that controls a valve that releases pressurized gas to launch projectile weights 16. In other configurations, projectile weights 16 are launched with one or more explosive charge.

Net 18 can be made from textile or polymer cords or metal cords or a combination of materials as need to prevent tearing and breaking of net 18 when encountering fast spinning rotors.

Net 18 can be provided with electronic disablement, chemical disablement, and/or explosive disablement to act against target 8. These features can be carried by the net material or by weights 16. For example, weights 16 can be batteries that provide a current to the net to interfere or disable target 8. In another configuration, weights 16 can be explosive charges with timers.

Figure 2:
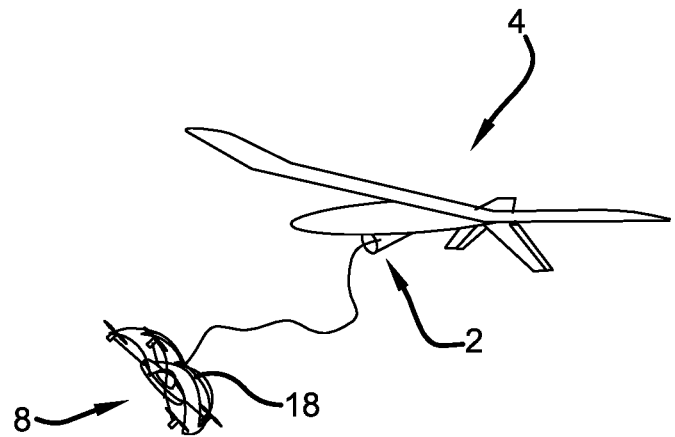
FIG. 2 depicts the successful arrest and capture of the airborne target of FIG. 1 by the fixed wing aircraft of FIG. 1.
Figure 3:
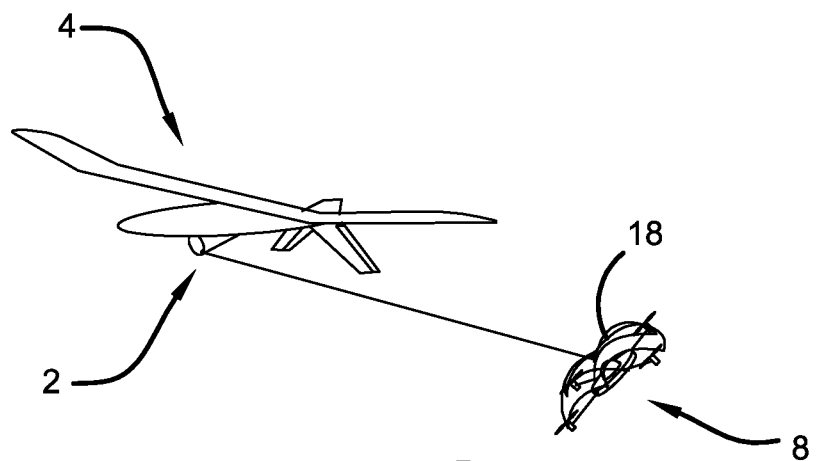
FIG. 3 depicts the fixed wing aircraft of FIG. 1 using the tethered device to retrieve the target.
Figure 4:
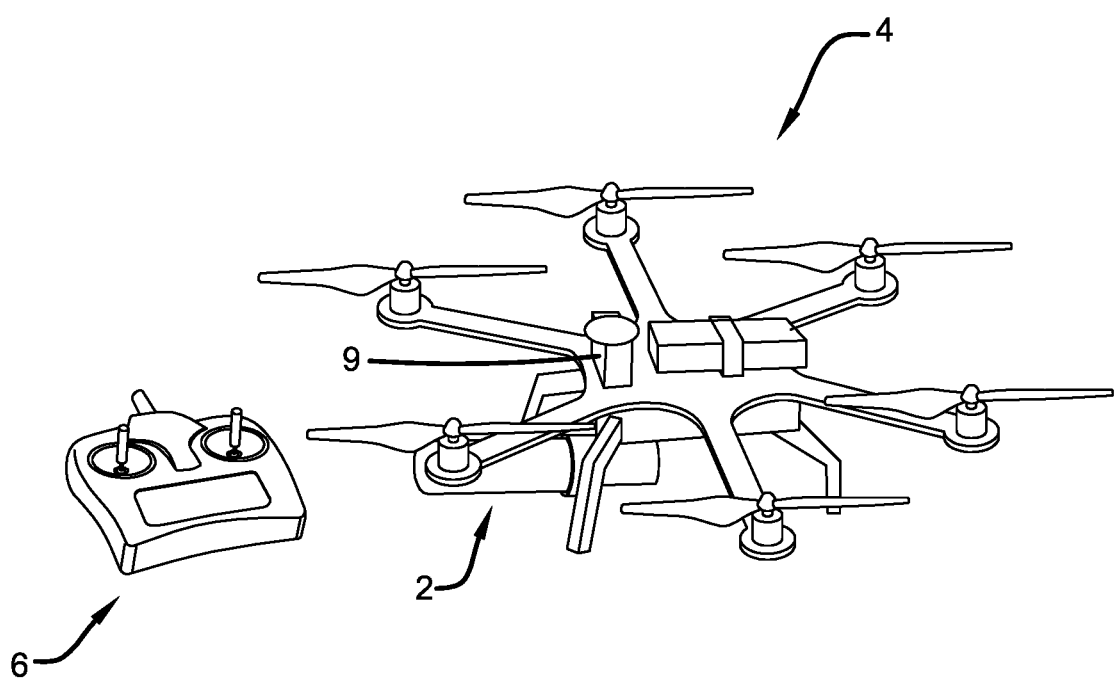
FIG. 4 depicts an exemplary multi-rotor UAV carried an exemplary device launcher with an exemplary wireless radio frequency controller.
Figure 5:
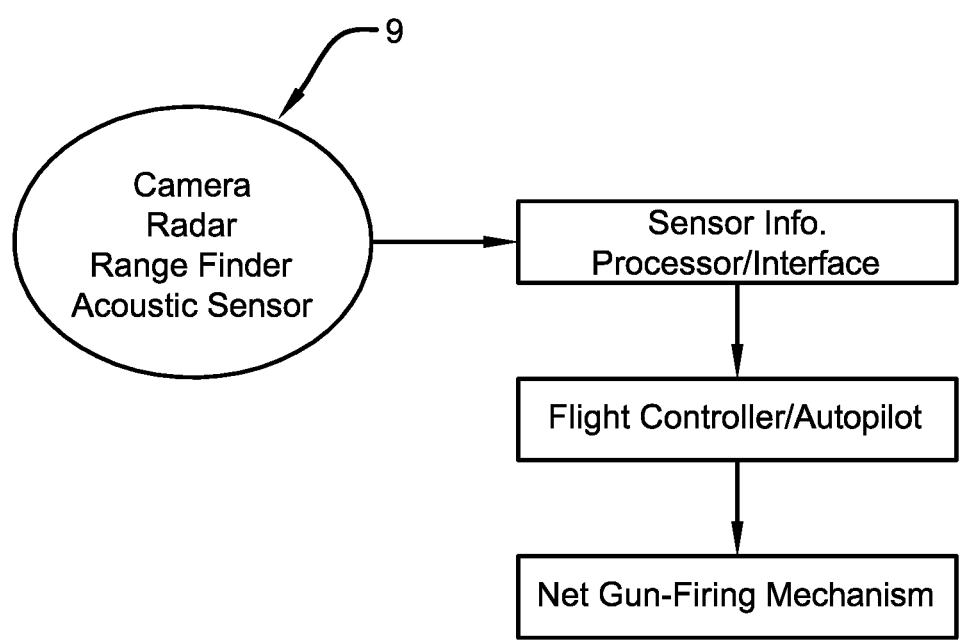
FIG. 5 is an overview flowchart describing an exemplary autonomous system for tracking a target and firing the system of the present disclosure.
Figure 6:
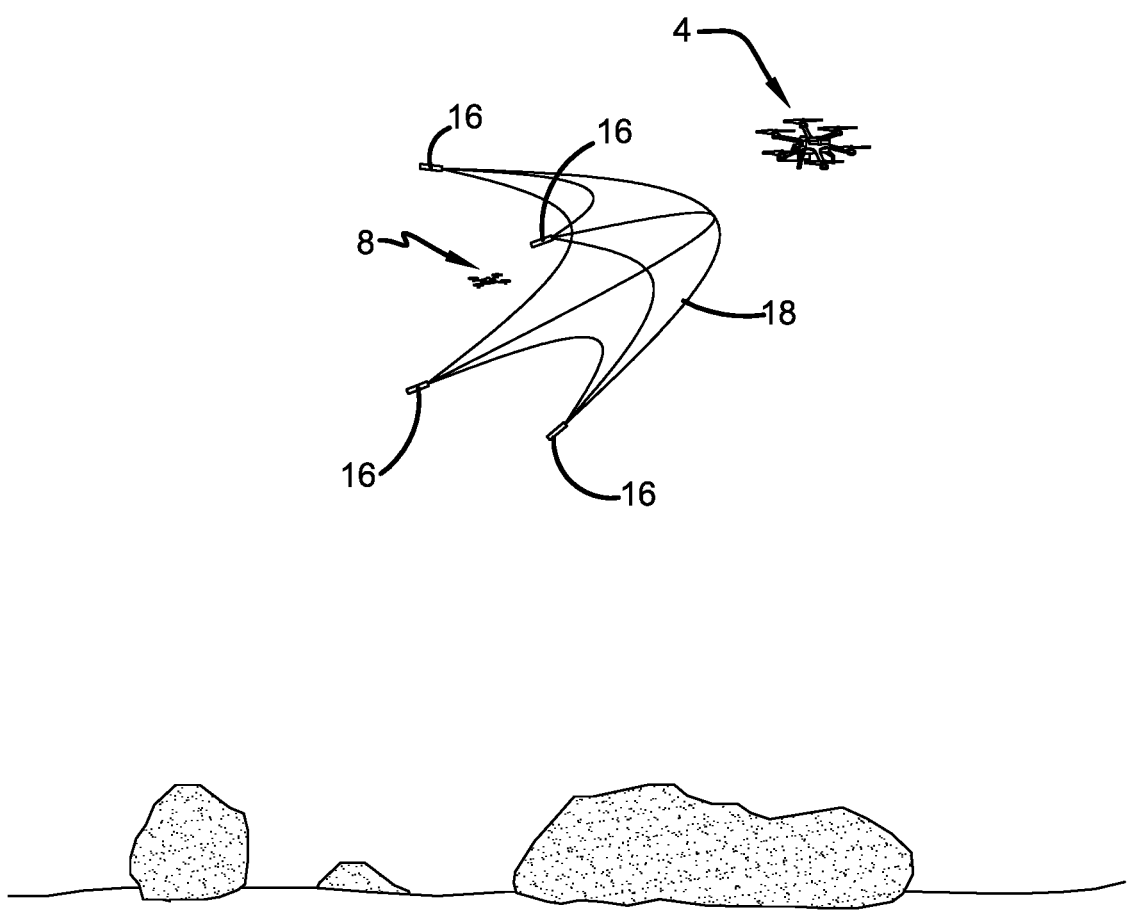
FIG. 6 depicts a device in the form of a net being launched from an airborne UAV at a target airborne UAV with the net being spread out by a plurality of projectile weights connected to the net.

Net 18 can be tethered to vehicle 4 with a tether as shown in FIGS. 1-3 or fired as an individual element as shown in FIG. 6. When net 18 is tethered, a winch can be provided to pull target 8 toward vehicle 4. When net 18 is tethered, a cutter can be provided to break the tethered by command if needed.

The switch receives a signal that triggers the launch of net 18. The signal can originate from the remote human operator of vehicle 4 or from a sensor 9 or a computer receiving data from sensor 9. Using an electrically-controlled valve to launch net 18 provides for remote operation while minimizing external force that could move launch device 2 off target.

Figure 7:
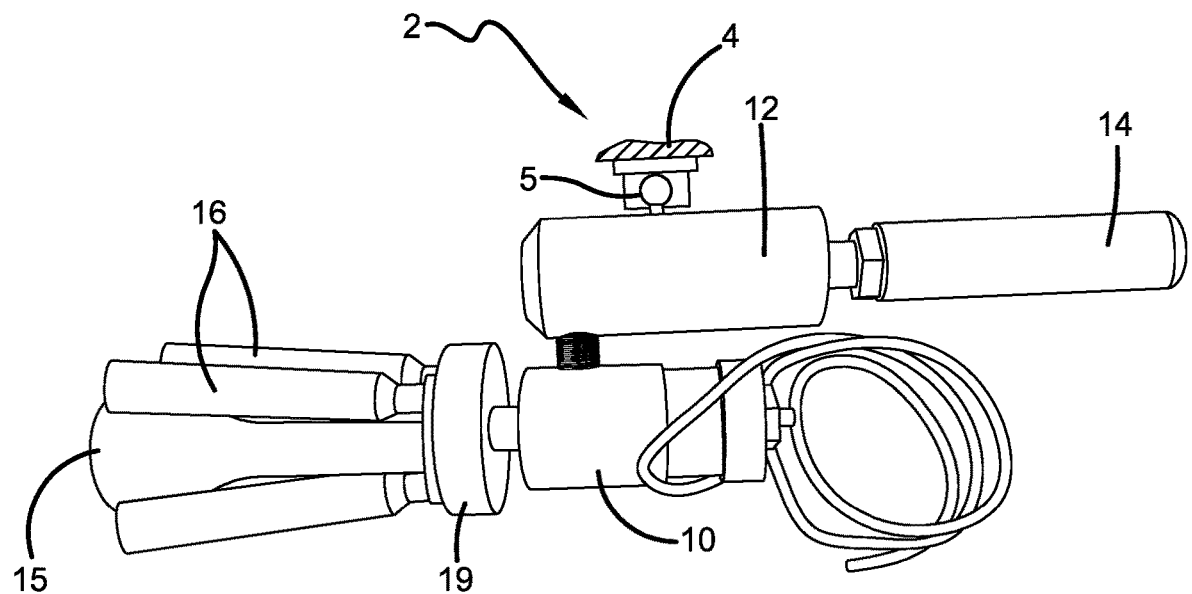
FIG. 7 is a side view of an exemplary configuration for the device launcher.
Figure 8:
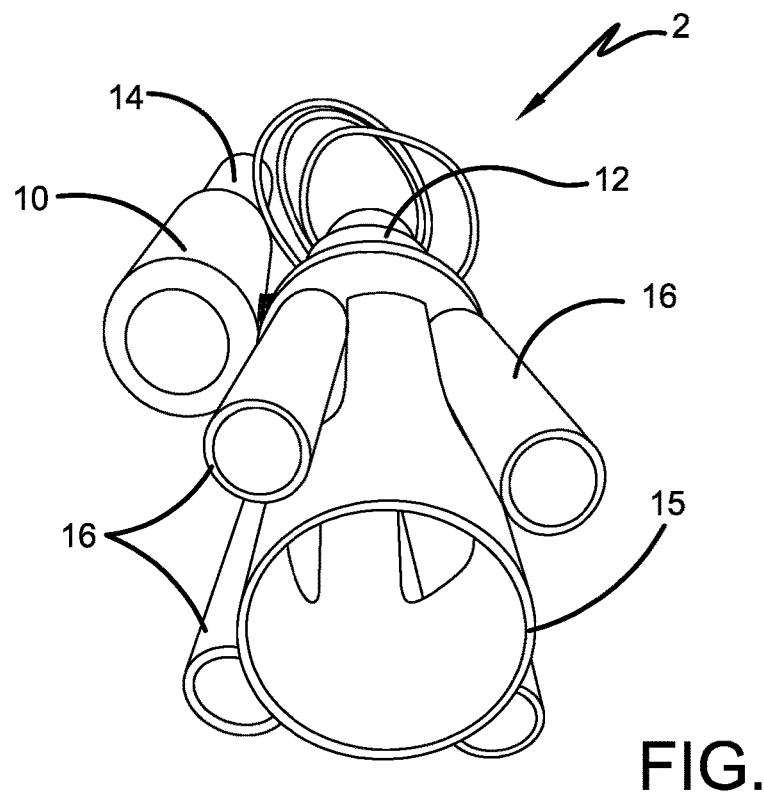
FIG. 8 is an end view of the device launcher of FIG. 7.
Figure 26:
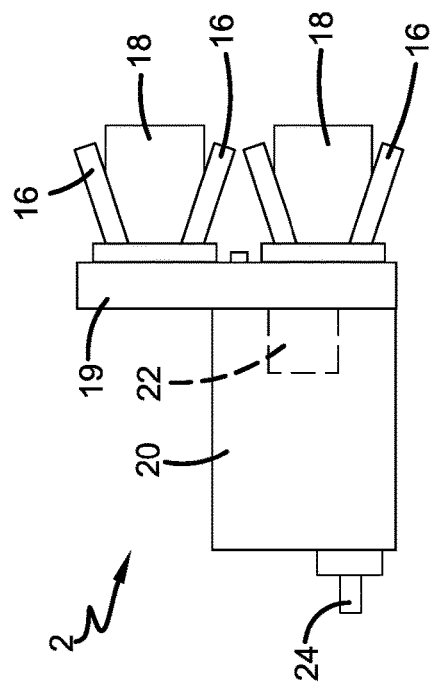
FIG. 26 is a side view of the device launcher of FIG. 23.
Figure 25:
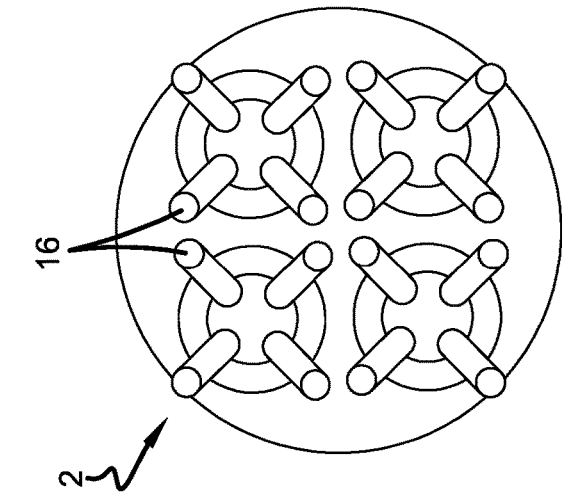
FIG. 25 is an end view from the right side of FIG. 23 (nets not shown for clarity).
Figure 24:
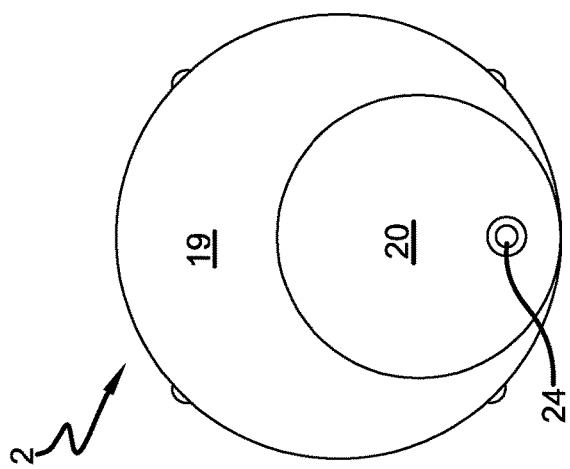
FIG. 24 is an end view from the left side of FIG. 23.
Figure 23:
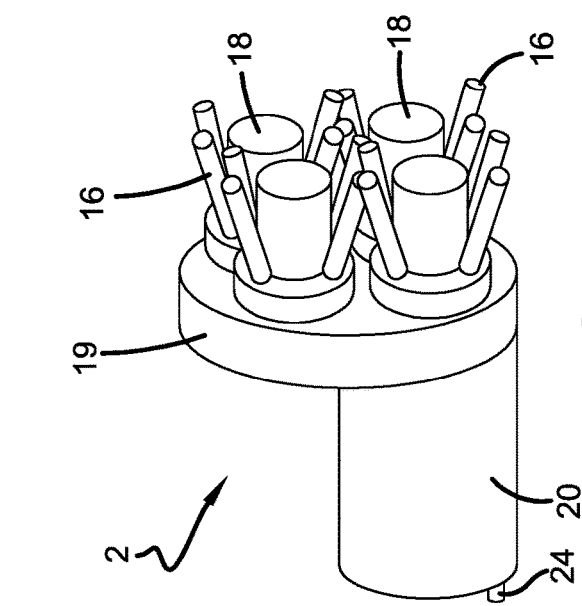
FIG. 23 is a perspective view of another configuration for the device launcher that carries multiple launchable devices.

FIGS. 7-14 depict an exemplary configuration for the launch device 2 which includes an electronically controlled valve 10 in selective fluid communication with an expansion chamber 12 and a supply of gas such as the compressed carbon dioxide container 14 depicted. Expansion chamber 12 is used to ensure there is a sufficient volume of compressed gas that can be immediately provided against weights 16 to launch weights 16 as needed. Although some configurations of container 14 release their compressed gas fat enough to multiple weights 16, expansion chamber 12 allows weights 16 to be launched using standard compressed gas canisters such as those used in pellet guns. Net 18 can be disposed within an optional cone-shaped sleeve 15 that minimizes tangling of net 18 with projectile weights 16. FIGS. 7 and 8 depict configurations with sleeve 15 while FIGS. 9-11 depict net 18 packed directly between weights 16. FIGS. 13 and 14 have net 18 removed for clarity. When net 18 is to be deployed, valve 10 is opened to allow the compressed gas in the expansion chamber 12 to launch projectile weights 16 which are connected to different portions of net 18 to help it spread out to its full area to be an effective capture device. A gas distribution block 19 evenly distributes the compressed gas to each of projectile weights 16 causing them to launch at the same time with the same amount of force. Valve 10 can be controlled by the operator of the aerial vehicle by sending a command through a radio frequency signal. Valve 10 can be controlled automatically from a sensor carried by the aerial vehicle. In one configuration, almost all of the gas from container 14 is used to fill expansion chamber 10 when container 14 as connected to chamber 10. In configurations wherein all of this compressed gas is not needed for a launch, valve 10 controls the release of the gas so that multiple launches can be achieved (after loading a net 18 each time) without changing container 14. In another configuration, a valve can be used to fill chamber 10 and hold compressed gas in container 14 so that device 2 can be fired again when another net 18 is loaded for launch. In this configuration, all of the compressed gas in expansion chamber 10 can be used for a single launch because it can be refilled from container 14.

FIG. 8 is an end view of the system of FIG. 7. Although four projectile weights 16 are depicted in FIGS. 7 and 8, different numbers, arrangements, and shapes of projectile weights 16 can be used with net 18. Projectile weights 16 can number from a single projectile weight 16 to a plurality as needed to carry and spread net 18.

FIGS. 15-18 depict another configuration for device launcher 2 that is more compact and thus easier to carry by vehicle 4. In this configuration, housing 20 receives the compressed gas supply container 14 such as the carbon dioxide canister. A plug 21 can be used to push container 14 against a valve release pin 23 to release the gas into the chamber of housing 20 such that housing 20 functions as the expansion chamber for the gas. Plug 21 can be threaded to housing or fit in with a push and twist bayonet-style locking motion. Plug 21 seals the chamber of housing 20. Housing 20 also carries the electrically-controlled switch 22 that opens a valve to release the compressed gas to launch the projectile weights 16. Housing 20 defines a chamber that is filled with compressed gas from container 14 so that enough volume of gas is provided to launch projectile weights 16 a desired distance. Switch 22 causes the release of the pressurized gas from the chamber of housing 20 to block 19. This configuration is more compact than the configuration of FIG. 7 and is easier to mount for gimbaled movement on vehicle 4.

FIGS. 19-22 depict another configuration for device 2 wherein a canister of compressed gas is not carried by device 2. In this configuration, the chamber of housing 20 charged with compressed gas through a recharging valve 24. Recharging valve 24 can be a ball valve that provides for quick connect and quick disconnect for fast recharging of housing 20. This system can work with compressed air or other compressed gas. This system is lighter because the gas canister is not carried by the aerial vehicle 4. This system also allows for quick recharging of device 2 for more rapid reloading and deployment. In this configuration, the chamber of housing 20 can be large enough to hold a volume of compressed gas sufficient to launch multiple devices 2.

In these configurations, valves 10 and 22 can carry their own power supplies, communications and control links with the user's controller 6 or the onboard computer. In other configurations, valves 10 and 22 use the power and control features of the onboard computer or controller that is controlling vehicle 4.

In these configurations, device launcher 2 can be provided with an individual tether line for each projectile weight 16.

Each individual tether line is connected to a winch disposed within or behind gas distribution block 19 or on or within the tube or guide for weight 16. These individual tether lines may be of any length and material necessary to allow net 18 to be launched to its maximum distance without interference from the individual tether lines. The individual tether lines remain attached to projectile weights 16 and/or net 18 after launch, and may serve to keep net 18 attached to vehicle 4 for the purpose of relocating or carrying off target 8 after being successfully netted. However, should target 8 be missed, the individual tether lines allow projectile weights 16 and net 18 to be pulled back to gas distribution block 19, thereby reloading projectile weights 16 into block 19 or the firing tubes/guides to allow device 2 to be fired again. The individual tether lines may be pulled back by use of one or more winches (with pulleys or guides), springs, or compressed air. As they are pulled back to device 2, projectile weights 2 are realigned and reloaded with guides or rails.

FIGS. 23-26 depict a configuration for device 2 wherein a plurality of nets 18 can be launched one after another by moving gas distribution block 19 with respect to the pressurized chamber of housing 19. These configurations are depicted with recharging 24 but they can also carry compressed gas canisters as above. In the configuration of these drawings, gas distribution block 19 rotates through four firing positions. Gas distribution block 19 can also be configured to slide between firing positions or slide across and then down through an array of firing positions. A minimum of two firing positions are provided with the maximum number being defined by the size of net 18, block 19, and vehicle 4.

Block 19 defines the passageways for the compressed gas that lead from valve 22 (which can be in the configuration of FIGS. 7-22 or disposed entirely within housing 20) to the seats that receive the inner ends of projectile weights 16. Block 19 can be turned with a motor or with a portion of the compressed gas.

Another configuration similar in appearance to FIGS. 23-26 does not rotate or move block 19. Instead, valve 22 or a series of valves downstream of valve 22 within block 19 or housing 20 are used to selectively deliver the compressed gas to the different firing positions. These are controlled electronically such that only one is open at a time for each single launch. Alternatively, the valves can be configured to automatically close (after initial use) and open (prior to initial use—having started in a closed configuration) during a launch such that the next burst of compressed gas is delivered to the next valve in line. This system can thus be electronically controlled or mechanically/pneumatically controlled.

Figure 28:
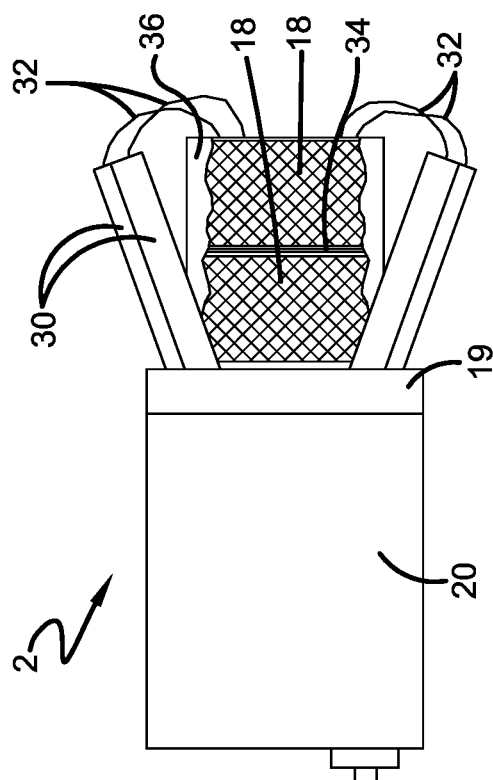
FIG. 28 is a side view of FIG. 27.
Figure 30:
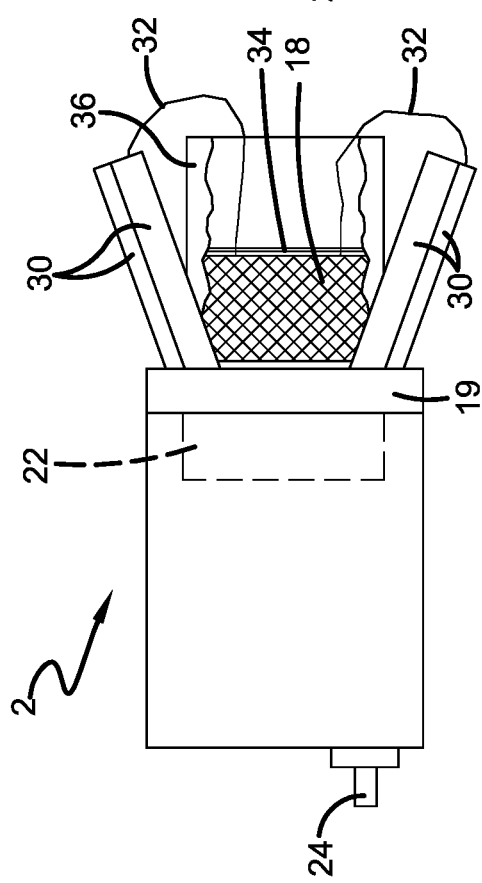
FIG. 30 is a side view of FIG. 29.
Figure 27:
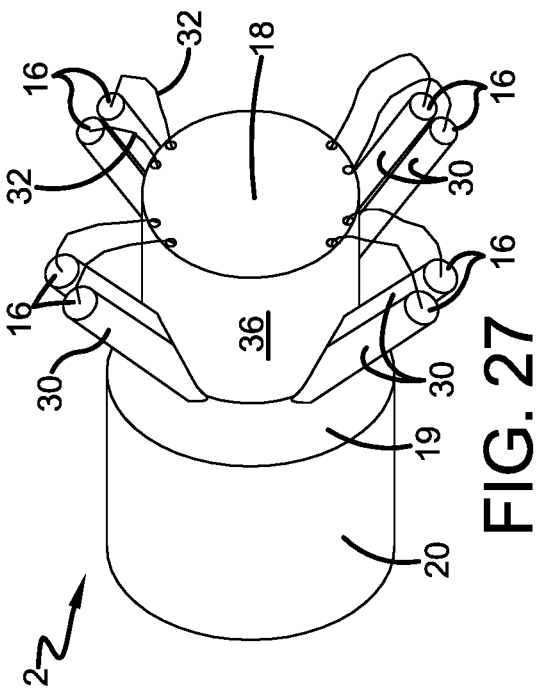
FIG. 27 is a perspective view of another configuration for the device launcher that carries multiple launchable devices.
Figure 29:
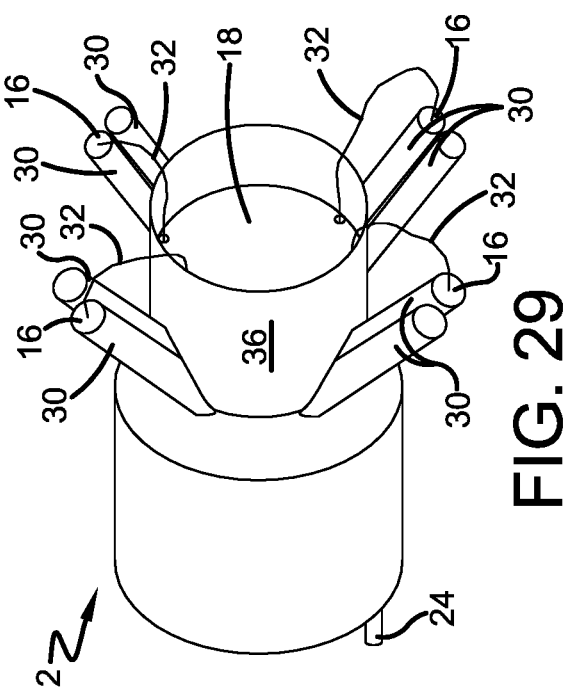
FIG. 29 is a perspective view of the configuration of FIG. 27 with a first device already launched from the device.

In the configuration of FIGS. 27-30 a plurality of nets 18 are stacked one on top of the other with the valves configured to launch weights 16 from the outermost net 18 first and before switching the next net 18 in line. The delivery of the pressurized gas can be controlled with valves as above or by moving block 19 as above. FIGS. 27 and 28 show two nets 18 stacked with FIGS. 29 and 30 showing the configuration after the first net 18 is launched. In these configurations, weights 16 are disposed in launch tubes 30. Cables 32 are depicted here as connecting weights 16 to nets 18. An optional net separation disc 34 can be disposed between nets 18. Disc 34 can be dragged out by the first launch or can remain for the second launch. Nets 18 are packed within a net container 36 to maintain their packed configuration.

The example shows eight launch tubes 30 for the purpose of launching two nets 18, however there can be any number of tubes 30 and Net Containers for firing any number of nets.

In an alternative configuration, nets 18 can be stacked in an array such as two-by-two and two deep to provide eight nets 18 for launch.

The device launcher and arresting system of the disclosure is capable of the following:

1. Able to be mounted to and launched from an airborne platform such as an unmanned aerial vehicle (UAV) that can be fixed wing or rotor-style;
2. Able to launch a net for the purpose of capturing, arresting, detaining, obstructing, and/or relocating another aircraft, including but not limited to manned aircraft or unmanned aircraft, fixed wing, rotorcraft, ducted-fan, ornithopter, rocket/missile, lighter-than-air, and/or ground vehicles (manned or unmanned), and/or humans whether on the ground or in the air, and/or animals whether on the ground or in the air (cumulatively known as the "target");
3. Able to launch the net for "air-to-air" or "air-to-ground" applications against a target;
4. Able to launch the net manually, and/or through a remote controlled system, and/or through an autopilot system, and/or through a sensor system;
5. Once the net is deployed, it may be immediately released/separated from the launch platform, or may be tethered/attached to the launch platform for the purpose of dragging or lifting the "target" to another location, with the tether able to be released from the launch platform as required at a later time;
6. The net may include an aerodynamic retardation system (i.e. parachute) to prevent an airborne "target" from continuing its operation/movement, or to retard the target's decent;
7. The aerial capturing/arresting system may be capable of a single net launch or may have multiple net launching capabilities;
8. The aerial capturing/arresting system may be mounted in such a way that allows launching the net forward, backward, to either side, up, down, or any combination thereof to allow a net launch in any direction from the platform;
9. The aerial capturing system may have means of disabling the "target" in addition to the physical capturing/disruption. This may include, but is not limited to electronic disablement, chemical disablement, and/or explosive disablement.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the embodiments are examples and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A method of disabling a target unmanned aerial vehicle using another unmanned aerial vehicle while both are flying, the method comprising the steps of:

mounting a net launch device on a first unmanned aerial vehicle in such a way that allows launching the net forward, backward, to either side, up, down, and combinations thereof;

aiming the net launch device mounted on the first unmanned aerial vehicle at a target unmanned aerial vehicle; and launching a net from the net launch device at the target unmanned aerial vehicle with the entire body of the net moving away from the net launch device.

2. The method of claim 1, further comprising the step of activating the launching step manually by a remote user.

3. The method of claim 1, further comprising the step of launching the net through a remote controlled system.

4. The method of claim 1, further comprising the step of launching the net through an autopilot system.

5. The method of claim 1, further comprising the step of launching the net through a sensor system.

6. The method of claim 1, wherein the net is tethered to the first unmanned aerial vehicle and further comprising the step of releasing the net from the first unmanned aerial vehicle after the net has been launched.

7. The method of claim 6, wherein the step of releasing the net from the first unmanned aerial vehicle further comprises the step of releasing the net with an aerodynamic retardation system attached to the net.

8. The method of claim 1, further comprising the step of providing the first unmanned aerial vehicle in the form of a fixed wing aircraft.

9. The method of claim 1, further comprising the step of providing the first unmanned aerial vehicle in the form of a rotorcraft aircraft.

10. The method of claim 1, further comprising the step of providing the first unmanned aerial vehicle in the form of a ducted-fan aircraft.

11. The method of claim 1, further comprising the step of mounting a plurality of net launch devices to the first unmanned aerial vehicle.

12. A method of disabling a target unmanned aerial vehicle using another unmanned aerial vehicle while both are flying, the method comprising the steps of:

mounting a net launch device on a first unmanned aerial vehicle in such a way that allows launching the net forward, backward, to either side, up, down, and combinations thereof;

aiming the net launch device mounted on the first unmanned aerial vehicle that is flying in a forward direction at a target unmanned aerial vehicle located in front of the first unmanned aerial vehicle; and launching a net from the net launch device at the target unmanned aerial vehicle with the entire body of the net moving away from the net launch device in a forward direction with respect to the first unmanned aerial vehicle.

13. A method of disabling a target unmanned aerial vehicle using another unmanned aerial vehicle while both are flying, the method comprising the steps of:

mounting a net launch device on a first unmanned aerial vehicle in such a way that allows launching the net forward, backward, to either side, up, down, and combinations thereof;

aiming the net launch device mounted on the first unmanned aerial vehicle at a target unmanned aerial vehicle;

launching a net from the net launch device at the target unmanned aerial vehicle with the entire body of the net moving away from the net launch device;

capturing the target unmanned aerial vehicle with the net; and after the target unmanned aerial vehicle has been captured, continuing to fly the first unmanned aerial vehicle.

14. The method of claim 13, wherein the net is tethered to the first unmanned aerial vehicle and further comprising the step dragging and lifting the target unmanned aerial vehicle with the first unmanned aerial vehicle from one location to another location.

15. The method of claim 14, further comprising the step of releasing the net from the first unmanned aerial vehicle.

16. The method of claim 15, wherein the step of releasing the net from the first unmanned aerial vehicle further comprises the step of releasing the net with an aerodynamic retardation system attached to the net.

17. A method of disabling a target unmanned aerial vehicle using another unmanned aerial vehicle while both are flying, the method comprising the steps of:

mounting a net launch device on a first unmanned aerial vehicle;

aiming the net launch device mounted on the first unmanned aerial vehicle that is flying in a forward direction at a target unmanned aerial vehicle located in front of the first unmanned aerial vehicle;

launching a net from the net launch device at the target unmanned aerial vehicle with the entire body of the net moving away from the net launch device in the forward direction with respect to the first unmanned aerial vehicle; and wherein the net is tethered to the first unmanned aerial vehicle and further comprising the steps of capturing the target unmanned vehicle with the net and then dragging and lifting the target unmanned aerial vehicle with the first unmanned aerial vehicle from one location to another location.

18. The method of claim 17, further comprising the step of releasing the net from the first unmanned aerial vehicle after the target unmanned vehicle has been captured.

19. The method of claim 18, wherein the step of releasing the net from the first unmanned aerial vehicle further comprises the step of releasing the net with an aerodynamic retardation system attached to the net.

20. The method of claim 17, further comprising the step of activating the launching step through one of a remote controlled system, an autopilot system, a sensor system, and a manual system.

* * * * *